US007818667B2

(12) United States Patent
Adams

(10) Patent No.: US 7,818,667 B2
(45) Date of Patent: Oct. 19, 2010

(54) VERIFICATION OF SEMANTIC CONSTRAINTS IN MULTIMEDIA DATA AND IN ITS ANNOUNCEMENT, SIGNALING AND INTERCHANGE

(75) Inventor: Glenn Adams, Acton, MA (US)

(73) Assignee: TV Works LLC, Mill Valley, CA (US)

( * ) Notice: Subject to any disclaimer, the term of this patent is extended or adjusted under 35 U.S.C. 154(b) by 1204 days.

(21) Appl. No.: 11/381,508

(22) Filed: May 3, 2006

(65) Prior Publication Data

US 2008/0250044 A1 Oct. 9, 2008

Related U.S. Application Data

(63) Continuation-in-part of application No. 11/253,892, filed on Oct. 18, 2005.

(60) Provisional application No. 60/677,759, filed on May 3, 2005.

(51) Int. Cl.
*G06F 3/00* (2006.01)
(52) U.S. Cl. .............. 715/237; 715/234; 715/201; 715/202; 725/39; 725/54; 725/136
(58) Field of Classification Search .......... 715/237, 715/234, 201, 202; 725/39, 54, 136
See application file for complete search history.

(56) References Cited

U.S. PATENT DOCUMENTS 7,221,801 B2 * 5/2007 Jang et al. ............... 382/232
7,440,967 B2 * 10/2008 Chidlovskii ............... 1/1
7,587,415 B2 * 9/2009 Gaurav et al. ............. 1/1
7,640,487 B2 * 12/2009 Amielh-Caprioglio et al. ............... 715/203
2003/0023970 A1 * 1/2003 Panabaker ............... 725/32
2005/0287948 A1 * 12/2005 Hellwagner et al. ......... 455/3.01

OTHER PUBLICATIONS

Sylvain Devillers, Bitstream Syntax Definition Language: an input to MPEG-21 COntent Representation, Mar. 2001, ISO, ISO/IEC JTC1/SC29/WG11 MPEG01/M7053.*
Fernando Pereira; Touradj Ebrahimi, The MPEG-4 Book, Jul. 10, 2002, Prentice Hall, Section 2.5, 7.4, 7.5.*
Michael Adams, OpenCable Architecture, Dec. 3, 1999, Cisco Press, Chapter 15.*
Mark Riehl; Ilya Sterin, XML and Perl, Oct. 16, 2002, Sams, Chapter 1.*

* cited by examiner

*Primary Examiner*—Stephen S Hong
*Assistant Examiner*—I-Chan Yang
(74) *Attorney, Agent, or Firm*—Banner & Witcoff, Ltd.

(57) ABSTRACT

A collection of well-formed, but possibly semantically invalid, binary encoded multimedia data components or packages as well as the binary encoded announcement, signaling, and interchange protocols used in their transmission are converted into one or more well-formed extensible markup language (XML) files. Such XML files may then be validated according to one or more pre-defined XML schemas, or similar schema languages, in order to verify that the data and protocol structures and substructures adhere to prior defined semantic constraints.

19 Claims, 28 Drawing Sheets

```xml
<xs:schema xml:lang="en" targetNamespace="http://www.xfsi.com/2005/ebifx-i01"
 xmlns:xs="http://www.w3.org/2001/XMLSchema" xmlns="http://www.xfsi.com/2005/ebifx-i01">
  <!-- Inclusions -->
  <xs:include schemaLocation="primitives.xsd"/>
  <!-- Section 10 - General -->
  <xs:group name="Widget.class">
    <xs:choice>
      <xs:element name="Button" type="Button.type"/>
      <xs:element name="Collection" type="Collection.type"/>
      <xs:element name="Container" type="Container.type"/>
      <xs:element name="Page" type="Page.type"/>
      <xs:element name="Rectangle" type="Rectangle.type"/>
      <xs:element name="ScaledVideo" type="ScaledVideo.type"/>
      <xs:element name="Text" type="Text.type"/>
      <xs:element name="Timer" type="Timer.type"/>
    </xs:choice>
  </xs:group>
  <xs:complexType name="Widget.base">
        <xs:sequence>
          <xs:element name="wType" type="uint8"/>
          <xs:element name="wStyle" type="StyleOffset.type"/>
        </xs:sequence>
    <xs:attribute name="id" type="xs:ID" use="required"/>
  </xs:complexType>
  <!-- Section 10.2 - Button -->
  <xs:complexType name="Button.type">
    <xs:complexContent>
      <xs:extension base="Widget.base">
        <xs:sequence>
          <xs:element name="bwX" type="int16"/>
          <xs:element name="bwY" type="int16"/>
          <xs:element name="bwWidth" type="int16"/>
          <xs:element name="bwHeight" type="int16"/>
          <xs:element name="bwText" type="OptRefIndex.type"/>
          <xs:element name="bwTextXOffset" type="int8"/>
          <xs:element name="bwTextYOffset" type="int8"/>
          <xs:element name="bwHidden" type="bool8"/>
          <xs:element name="bwDisabled" type="bool8"/>
          <xs:element name="bwOnClick" type="ActionIndex.type"/>
          <xs:element name="bwOnFocus" type="ActionIndex.type"/>
          <xs:element name="bwOnBlur" type="ActionIndex.type"/>
          <xs:element name="bwOnMouse" type="ActionIndex.type"/>
        </xs:sequence>
      </xs:extension>
    </xs:complexContent>
  </xs:complexType>
  <!-- Section 10.3 - Collection -->
  <xs:complexType name="Collection.type">
    <xs:complexContent>
      <xs:extension base="Widget.base">
        <xs:sequence>
          <xs:element name="cwTableIndex" type="OptWidgetTableIndex.type"/>
        </xs:sequence>
      </xs:extension>
    </xs:complexContent>
  </xs:complexType>
```

Fig. 2A

```xml
<!-- Section 10.4 - Container -->
<xs:complexType name="Container.type">
   <xs:complexContent>
      <xs:extension base="Widget.base">
         <xs:sequence>
            <xs:element name="cwX" type="int16"/>
            <xs:element name="cwY" type="int16"/>
            <xs:element name="cwFocus" type="int16"/>
            <xs:element name="cwSelectedButton" type="int16"/>
            <xs:element name="cwHidden" type="bool8"/>
            <xs:element name="cwNavmap" type="OptNavMapOffset.type"/>
            <xs:element name="cwTableIndex" type="OptWidgetTableIndex.type"/>
         </xs:sequence>
      </xs:extension>
   </xs:complexContent>
</xs:complexType>
<!-- Section 10.10 - Page -->
<xs:complexType name="Page.type">
   <xs:complexContent>
      <xs:extension base="Widget.base">
         <xs:sequence>
            <xs:element name="pwFocus" type="OptRefIndex.type"/>
            <xs:element name="pwBackgroundRef" type="OptRefIndex.type"/>
            <xs:element name="pwSelectedButton" type="OptRefIndex.type"/>
            <xs:element name="pwBackgroundMode" type="uint8"/>
            <xs:element name="pwUniquePageID" type="int32"/>
            <xs:element name="pwTimeout" type="int32"/>
            <xs:element name="pwRequireFreshData" type="bool8"/>
            <xs:element name="pwOnData" type="ActionIndex.type"/>
            <xs:element name="pwOnLoad" type="ActionIndex.type"/>
            <xs:element name="pwOnUnload" type="ActionIndex.type"/>
            <xs:element name="pwOnPrerender" type="ActionIndex.type"/>
            <xs:element name="pwOnTimeout" type="ActionIndex.type"/>
            <xs:element name="pwOnServiceSelection" type="ActionIndex.type"/>
            <xs:element name="pwEvents" type="OptEventsOffset.type"/>
            <xs:element name="pwNavmap" type="OptNavMapOffset.type"/>
            <xs:element name="pwDataFileSrcName" type="uint16"/>
            <xs:element name="pwTriggerHandlers" type="uint16"/>
            <xs:element name="pwTableIndex" type="OptWidgetTableIndex.type"/>
         </xs:sequence>
      </xs:extension>
   </xs:complexContent>
</xs:complexType>
<!-- Section 10.13 - Rectangle -->
<xs:complexType name="Rectangle.type">
   <xs:complexContent>
      <xs:extension base="Widget.base">
         <xs:sequence>
            <xs:element name="rwX" type="int16"/>
            <xs:element name="rwY" type="int16"/>
            <xs:element name="rwWidth" type="int16"/>
            <xs:element name="rwHeight" type="int16"/>
            <xs:element name="rwHidden" type="bool8"/>
            <xs:element name="rwXRadius" type="uint8"/>
            <xs:element name="rwYRadius" type="uint8"/>
         </xs:sequence>
      </xs:extension>
   </xs:complexContent>
</xs:complexType>
```

Fig. 2B

```xml
<!-- Section 10.15 - ScaledVideo -->
<xs:complexType name="ScaledVideo.type">
    <xs:complexContent>
        <xs:extension base="Widget.base">
            <xs:sequence>
                <xs:element name="svwX" type="int16"/>
                <xs:element name="svwY" type="int16"/>
                <xs:element name="svwWidth" type="int16"/>
                <xs:element name="svwHeight" type="int16"/>
                <xs:element name="svwHidden" type="bool8"/>
                <xs:element name="svwSrc" type="OptRefIndex.type"/>
            </xs:sequence>
        </xs:extension>
    </xs:complexContent>
</xs:complexType>
<!-- Section 10.17 - Text -->
<xs:complexType name="Text.type">
    <xs:complexContent>
        <xs:extension base="Widget.base">
            <xs:sequence>
                <xs:element name="txwX" type="int16"/>
                <xs:element name="txwY" type="int16"/>
                <xs:element name="txwWidth" type="int16"/>
                <xs:element name="txwHeight" type="int16"/>
                <xs:element name="txwText" type="OptRefIndex.type"/>
                <xs:element name="txwTextXOffset" type="int8"/>
                <xs:element name="txwTextYOffset" type="int8"/>
                <xs:element name="txwHidden" type="bool8"/>
                <xs:element name="txwEllipsis" type="bool8"/>
            </xs:sequence>
        </xs:extension>
    </xs:complexContent>
</xs:complexType>
<!-- Section 10.19 - Timer -->
<xs:complexType name="Timer.type">
    <xs:complexContent>
        <xs:extension base="Widget.base">
            <xs:sequence>
                <xs:element name="twPeriod" type="int32"/>
                <xs:element name="twLoop" type="int16"/>
                <xs:element name="twOnTimer" type="ActionIndex.type"/>
                <xs:element name="twRepetitionsRemaining" type="int16"/>
                <xs:element name="twFiretime" type="int32"/>
                <xs:element name="twEnabled" type="bool8"/>
            </xs:sequence>
        </xs:extension>
    </xs:complexContent>
</xs:complexType>
</xs:schema>
```

Fig. 2C

```xml
<xs:schema xml:lang="en" targetNamespace="http://www.xfsi.com/2005/ebifx-i01"
 xmlns:xs="http://www.w3.org/2001/XMLSchema" xmlns="http://www.xfsi.com/2005/ebifx-i01">
 <!-- Inclusions -->
 <xs:include schemaLocation="primitives.xsd"/>
 <xs:include schemaLocation="refs.xsd"/>
 <!-- Section 8.4 - General -->
 <xs:complexType name="Tables.type">
   <xs:sequence>
        <xs:group ref="Table.class"  minOccurs="0" maxOccurs="unbounded"/>
        </xs:sequence>
 </xs:complexType>
 <xs:group name="Table.class">
        <xs:choice>
                <xs:element name="ActionTable" type="ActionTable.type"/>
                <xs:element name="GenericDataTable" type="GenericDataTable.type"/>
                <xs:element name="MetadataTable" type="MetadataTable.type"/>
                <xs:element name="PaletteTable" type="PaletteTable.type"/>
                <xs:element name="PlatformDirectoryTable" type="PlatformDirectoryTable.type"/>
                <xs:element name="RefTable" type="RefTable.type"/>
                <xs:element name="ResourceLocatorTable" type="ResourceLocatorTable.type"/>
                <xs:element name="TriggerTable" type="TriggerTable.type"/>
                <xs:element name="WidgetTable" type="WidgetTable.type"/>
        </xs:choice>
 </xs:group>
 <xs:complexType name="Table.base">
   <xs:sequence>
     <xs:element name="TableHeader" type="TableHeader.type"/>
   </xs:sequence>
   <xs:attribute name="id" type="xs:ID" use="required"/>
 </xs:complexType>
 <xs:complexType name="TableHeader.type">
    <xs:sequence>
      <xs:element name="thRows" type="uint16"/>
      <xs:element name="thRowWidth" type="uint16"/>
      <xs:element name="thMetadata" type="uint16"/>
      <xs:element name="thMetadataCount" type="uint8"/>
      <xs:element name="thOffsetBase" type="uint24"/>
      <xs:element name="thColumns" type="uint8"/>
      <xs:element name="thReserved" type="reserved8"/>
      <xs:element name="Column" type="Column.type" minOccurs="0" maxOccurs="unbounded"/>
    </xs:sequence>
 </xs:complexType>
 <xs:complexType name="Column.type">
    <xs:sequence>
      <xs:element name="thColumnType" type="uint8"/>
      <xs:element name="thColumnWidth" type="uint8"/>
      <xs:element name="thColumnOffset" type="uint16"/>
    </xs:sequence>
 </xs:complexType>
```

Fig. 3A

```xml
<!-- Section 9.1 - Action Table -->
<xs:complexType name="ActionTable.type">
   <xs:complexContent>
      <xs:extension base="Table.base">
         <xs:sequence>
            <xs:element name="Row" type="ActionRow.type" minOccurs="0" maxOccurs="unbounded"/>
         </xs:sequence>
      </xs:extension>
   </xs:complexContent>
</xs:complexType>
<xs:complexType name="ActionRow.type">
   <xs:sequence>
      <xs:element name="atAction" type="ActionOffset.type"/>
      <xs:element name="atNext" type="ActionIndex.type"/>
   </xs:sequence>
   <xs:attribute name="id" type="xs:ID" use="required"/>
</xs:complexType>
<!-- Section 9.2 - Generic Data Table -->
<xs:complexType name="GenericDataTable.type">
   <xs:complexContent>
      <xs:extension base="Table.base">
         <xs:sequence>
            <xs:element name="Row" type="GenericDataRow.type" minOccurs="0" maxOccurs="unbounded"/>
         </xs:sequence>
      </xs:extension>
   </xs:complexContent>
</xs:complexType>
<xs:complexType name="GenericDataRow.type">
   <xs:sequence>
      <xs:element name="Col" type="bitfield" minOccurs="1" maxOccurs="unbounded"/>
   </xs:sequence>
</xs:complexType>
<!-- Section 9.3 - Metadata Table -->
<xs:complexType name="MetadataTable.type">
   <xs:complexContent>
      <xs:extension base="Table.base">
         <xs:sequence>
            <xs:element name="Row" type="MetadataRow.type" minOccurs="0" maxOccurs="unbounded"/>
         </xs:sequence>
      </xs:extension>
   </xs:complexContent>
</xs:complexType>
<xs:complexType name="MetadataRow.type">
   <xs:sequence>
      <xs:element name="mtProperty" type="uint24"/> <!-- Column type 8 -->
      <xs:element name="mtValue" type="uint16"/> <!-- Column type 10 -->
   </xs:sequence>
</xs:complexType>
```

Fig. 3B

```xml
<!-- Section 9.4 - Palette Table -->
<xs:complexType name="PaletteTable.type">
    <xs:complexContent>
        <xs:extension base="Table.base">
            <xs:sequence>
                <xs:element name="Row" type="PaletteRow.type" minOccurs="0" maxOccurs="unbounded"/>
            </xs:sequence>
        </xs:extension>
    </xs:complexContent>
</xs:complexType>
<xs:complexType name="PaletteRow.type">
    <xs:sequence>
        <xs:element name="ptAlpha" type="uint8"/>  <!-- Column type 9 -->
        <xs:element name="ptRed" type="uint8"/>   <!-- Column type 9 -->
        <xs:element name="ptGreen" type="uint8"/> <!-- Column type 9 -->
        <xs:element name="ptBlue" type="uint8"/>  <!-- Column type 9 -->
    </xs:sequence>
    <xs:attribute name="id" type="xs:ID" use="required"/>
</xs:complexType>
<!-- Section 9.5 - Platform Directory Table -->
<xs:complexType name="PlatformDirectoryTable.type">
    <xs:complexContent>
        <xs:extension base="Table.base">
            <xs:sequence>
                <xs:element name="Row" type="PlatformDirectoryRow.type" minOccurs="0" maxOccurs="unbounded"/>
            </xs:sequence>
        </xs:extension>
    </xs:complexContent>
</xs:complexType>
<xs:complexType name="PlatformDirectoryRow.type">
    <xs:sequence>
        <xs:element name="pdtHWManufacturer" type="uint24"/> <!-- Column type 8 -->
        <xs:element name="pdtHWModel" type="int16"/>         <!-- Column type 2 -->
        <xs:element name="pdtHWVersion" type="int16"/>       <!-- Column type 2 -->
        <xs:element name="pdtSWManufacturer" type="uint24"/> <!-- Column type 8 -->
        <xs:element name="pdtSWModel" type="int16"/>         <!-- Column type 2 -->
        <xs:element name="pdtSWVersion" type="int16"/>       <!-- Column type 2 -->
        <xs:element name="pdtProfile" type="int8"/>          <!-- Column type 1 -->
        <xs:element name="pdtSectionType" type="uint8"/>     <!-- Column type 9 -->
        <xs:element name="pdtSection" type="uint32"/>        <!-- Column type 14 (11?) -->
        <xs:element name="pdtMinLength" type="uint32"/>      <!-- Column type 11 -->
    </xs:sequence>
</xs:complexType>
<!-- Section 9.6 - Reference Table -->
<xs:complexType name="RefTable.type">
    <xs:complexContent>
        <xs:extension base="Table.base">
            <xs:sequence>
                <xs:element name="Row" type="RefEntry.type" minOccurs="0" maxOccurs="unbounded">
                    <xs:annotation>
                        <xs:documentation>See refs.xsd for definition of RefEntry.type</xs:documentation>
                    </xs:annotation>
                </xs:element>
            </xs:sequence>
        </xs:extension>
    </xs:complexContent>
</xs:complexType>
```

Fig. 3C

```xml
<!-- Section 9.7 - Resource Locator Table -->
<xs:complexType name="ResourceLocatorTable.type">
    <xs:complexContent>
        <xs:extension base="Table.base">
            <xs:sequence>
                <xs:element name="Row" type="ResourceLocatorRow.type" minOccurs="0" maxOccurs="unbounded"/>
            </xs:sequence>
        </xs:extension>
    </xs:complexContent>
</xs:complexType>
<xs:complexType name="ResourceLocatorRow.type">
    <xs:sequence>
        <xs:element name="rltResource" type="uint24"/>     <!-- Column type 8 -->
        <xs:element name="rltLocator" type="uint16"/> <!-- Column type 5 -->
    </xs:sequence>
</xs:complexType>
<!-- Section 9.8 - Trigger Table -->
<xs:complexType name="TriggerTable.type">
    <xs:complexContent>
        <xs:extension base="Table.base">
            <xs:sequence>
                <xs:element name="Row" type="TriggerRow.type" minOccurs="0" maxOccurs="unbounded"/>
            </xs:sequence>
        </xs:extension>
    </xs:complexContent>
</xs:complexType>
<xs:complexType name="TriggerRow.type">
    <xs:sequence>
        <xs:element name="ttSource" type="uint24"/>      <!-- Column type 8 -->
        <xs:element name="ttIdentifier" type="uint16"/>  <!-- Column type 10 -->
        <xs:element name="ttFormat" type="uint16"/>      <!-- Column type 5 -->
        <xs:element name="ttDepth" type="uint8"/>        <!-- Column type 9 -->
    </xs:sequence>
</xs:complexType>
<!-- Section 9.9 - Widget Table -->
<xs:complexType name="WidgetTable.type">
    <xs:complexContent>
        <xs:extension base="Table.base">
            <xs:sequence>
                <xs:element name="Row" type="WidgetOffset.type" minOccurs="0" maxOccurs="unbounded"/>
            </xs:sequence>
        </xs:extension>
    </xs:complexContent>
</xs:complexType>
</xs:schema>
```

Fig. 3D

```xml
<xs:schema xml:lang="en" targetNamespace="http://www.xfsi.com/2005/ebifx-i01"
 xmlns:xs="http://www.w3.org/2001/XMLSchema" xmlns="http://www.xfsi.com/2005/ebifx-i01">
  <!-- Inclusions -->
  <xs:include schemaLocation="primitives.xsd"/>
  <!-- Section 11 - General -->
  <xs:group name="Struct.class">
    <xs:choice>
      <xs:element name="AlignmentStyleStruct" type="AlignmentStyleStruct.type"/>
      <xs:element name="BorderStyleStruct" type="BorderStyleStruct.type"/>
      <xs:element name="ColorStyleStruct" type="ColorStyleStruct.type"/>
      <xs:element name="FontStyleStruct" type="FontStyleStruct.type"/>
      <xs:element name="NavigationMapStruct" type="NavigationMapStruct.type"/>
      <xs:element name="StyleStruct" type="StyleStruct.type"/>
      <xs:element name="WidgetExtensionsStruct" type="WidgetExtensionsStruct.type"/>
      <xs:element name="String" type="String.type"/>
      <xs:element name="EmbeddedResource" type="EmbeddedResource.type"/>
    </xs:choice>
  </xs:group>
  <xs:complexType name="Struct.base">
    <xs:attribute name="id" type="xs:ID" use="required"/>
  </xs:complexType>
  <xs:complexType name="String.type">
    <xs:simpleContent>
      <xs:extension base="string">
        <xs:attribute name="id" type="xs:ID" use="required"/>
        <xs:attribute name="mutable" type="xs:boolean"/>
        <xs:attribute name="maxLength" type="xs:unsignedShort" use="optional" default="0"/>
      </xs:extension>
    </xs:simpleContent>
  </xs:complexType>
  <xs:complexType name="EmbeddedResource.type">
    <xs:simpleContent>
      <xs:extension base="xs:hexBinary">
        <xs:attribute name="id" type="xs:ID" use="required"/>
      </xs:extension>
    </xs:simpleContent>
  </xs:complexType>
  <!-- Section 11.1 - Alignment Style -->
  <xs:complexType name="AlignmentStyleStruct.type">
    <xs:complexContent>
      <xs:extension base="Struct.base">
        <xs:sequence>
          <xs:element name="asHAlign" type="int8"/>
          <xs:element name="asVAlign" type="int8"/>
        </xs:sequence>
      </xs:extension>
    </xs:complexContent>
  </xs:complexType>
```

Fig. 4A

```xml
<!-- Section 11.3 - Border Style -->
<xs:complexType name="BorderStyleStruct.type">
    <xs:complexContent>
        <xs:extension base="Struct.base">
            <xs:sequence>
                <xs:element name="bsStyle" type="nybble"/>
                <xs:element name="bsJoinStyle" type="nybble"/>
                <xs:element name="bsJoinRadius" type="uint8"/>
                <xs:element name="bsThickness" type="uint8"/>
                <xs:element name="bsLeftColor" type="ColorStyleOffset.type"/>
                <xs:element name="bsTopColor" type="ColorStyleOffset.type"/>
                <xs:element name="bsRightColor" type="ColorStyleOffset.type"/>
                <xs:element name="bsBottomColor" type="ColorStyleOffset.type"/>
            </xs:sequence>
        </xs:extension>
    </xs:complexContent>
</xs:complexType>
<!-- Section 11.4 - Color Style -->
<xs:complexType name="ColorStyleStruct.type">
    <xs:complexContent>
        <xs:extension base="Struct.base">
            <xs:sequence>
                <xs:element name="csType" type="nybble"/>
                <xs:element name="csReserved" type="reserved4"/>
                <xs:element name="csEnabled" type="uint32"/>
                <xs:element name="csFocused" type="uint32"/>
                <xs:element name="csSelected" type="uint32"/>
                <xs:element name="csDisabled" type="uint32"/>
            </xs:sequence>
        </xs:extension>
    </xs:complexContent>
</xs:complexType>
<!-- Section 11.7 - Fonts -->
<xs:complexType name="FontStruct.type">
    <xs:complexContent>
        <xs:extension base="Struct.base">
            <xs:sequence>
                <xs:element name="fsNumFonts" type="uint8"/>
                <xs:element name="Font" type="FontsEntry.type" minOccurs="0" maxOccurs="unbounded">
                </xs:element>
            </xs:sequence>
        </xs:extension>
    </xs:complexContent>
</xs:complexType>
<xs:complexType name="FontsEntry.type">
        <xs:sequence>
                <xs:element name="fsFamily" type="uint24"/>
                <xs:element name="fsSize" type="uint8"/>
                <xs:element name="fsShadow" type="bool8"/>
                <xs:element name="fsBold" type="bool8"/>
                <xs:element name="fsItalic" type="bool8"/>
        </xs:sequence>
</xs:complexType>
```

Fig. 4B

```xml
<!-- Section 11.8 - Font Style -->
<xs:complexType name="FontStyleStruct.type">
    <xs:complexContent>
        <xs:extension base="Struct.base">
            <xs:sequence>
                <xs:element name="fsEnabled" type="uint8"/>
                <xs:element name="fsFocused" type="uint8"/>
                <xs:element name="fsSelected" type="uint8"/>
                <xs:element name="fsDisabled" type="uint8"/>
            </xs:sequence>
        </xs:extension>
    </xs:complexContent>
</xs:complexType>
<!-- Section 11.11 - Navigation Map -->
<xs:complexType name="NavigationMapStruct.type">
    <xs:complexContent>
        <xs:extension base="Struct.base">
            <xs:sequence>
                <xs:element name="nsNumNavigableWidgets" type="uint8"/>
                <xs:element name="Entry" type="NavigationMapEntry.type" minOccurs="0" maxOccurs="unbounded"/>
            </xs:sequence>
        </xs:extension>
    </xs:complexContent>
</xs:complexType>
<xs:complexType name="NavigationMapEntry.type">
    <xs:sequence>
        <xs:element name="nsOwningIndex" type="uint16"/>
        <xs:element name="nsRowIndex" type="uint16"/>
        <xs:element name="nsUpTargetIndex" type="uint8"/>
        <xs:element name="nsDownTargetIndex" type="uint8"/>
        <xs:element name="nsLeftTargetIndex" type="uint8"/>
        <xs:element name="nsRightTargetIndex" type="uint8"/>
    </xs:sequence>
    <xs:attribute name="id" type="xs:ID" use="required"/>
</xs:complexType>
<!-- Section 11.12 - Style -->
<xs:complexType name="StyleStruct.type">
    <xs:complexContent>
        <xs:extension base="Struct.base">
            <xs:sequence>
                <xs:element name="ssAlignment" type="AlignmentStyleOffset.type"/>
                <xs:element name="ssBG1" type="ColorStyleOffset.type"/>
                <xs:element name="ssBG2" type="ColorStyleOffset.type"/>
                <xs:element name="ssFG1" type="ColorStyleOffset.type"/>
                <xs:element name="ssFG2" type="ColorStyleOffset.type"/>
                <xs:element name="ssBorder" type="BorderStyleOffset.type"/>
                <xs:element name="ssFont" type="FontStyleOffset.type"/>
                <xs:element name="ssExtensions" type="WidgetExtensionsStructOffset.type"/>
            </xs:sequence>
        </xs:extension>
    </xs:complexContent>
</xs:complexType>
```

Fig. 4C

```
<!-- Section 11.15 - Widget Extensions -->
<xs:complexType name="WidgetExtensionsStruct.type">
   <xs:complexContent>
      <xs:extension base="Struct.base">
         <xs:sequence>
            <xs:element name="wxsCount" type="uint8"/>
            <xs:element name="Extension" type="WidgetExtension.type" minOccurs="0" maxOccurs="unbounded"/>
         </xs:sequence>
      </xs:extension>
   </xs:complexContent>
</xs:complexType>
<xs:complexType name="WidgetExtension.type">
   <xs:sequence>
      <xs:element name="wxsProperty" type="uint24"/>
      <xs:element name="wxsValue" type="uint16"/>
   </xs:sequence>
</xs:complexType>
</xs:schema>
```

Fig. 4D

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
    <!-- Inclusions -->
    <xs:include schemaLocation="primitives.xsd"/>
    <!-- Section 9.6 -->
    <xs:complexType name="RefEntry.type">
        <xs:sequence>
            <xs:element name="rtType" type="uint8"/>
            <xs:element name="rfExtension" type="bool1"/>
            <xs:element name="rfCritical" type="bool1"/>
            <xs:element name="rfOriginalStringReference" type="bool1"/>
            <xs:element name="rfReadOnly" type="bool1"/>
            <xs:element name="rfReserved" type="reserved4"/>
            <!-- Data from fields rtByte0-5 is accounted for in the fields of each type of reference. -->
        </xs:sequence>
        <xs:attribute name="id" type="xs:ID" use="required"/>
    </xs:complexType>
    <!-- Section 9.6.7 - Widget Reference (5) -->
    <xs:complexType name="WidgetRef.type">
        <xs:complexContent>
            <xs:extension base="RefEntry.type">
                <xs:sequence>
                    <xs:element name="rf3WidgetTable" type="TableDirectoryIndexOrRefTableIndex.type"/>
                    <xs:element name="rf3Widget" type="RowIndexOrRefTableIndex.type"/>
                    <xs:element name="rf3Identifier" type="uint8"/>
                    <xs:element name="rf3Reserved" type="reserved8"/>
                </xs:sequence>
            </xs:extension>
        </xs:complexContent>
    </xs:complexType>
    <!-- Section 9.6.9 - Environment Property Reference (7) -->
    <xs:complexType name="EnvironmentPropertyRef.type">
        <xs:complexContent>
            <xs:extension base="RefEntry.type">
                <xs:sequence>
                    <xs:element name="rf4Property" type="uint8"/>
                    <xs:element name="rf4Byte" type="uint8" minOccurs="5" maxOccurs="5"/>
                </xs:sequence>
            </xs:extension>
        </xs:complexContent>
    </xs:complexType>
    <!-- Section 9.6.10 - String Reference (8) -->
    <xs:complexType name="StringRef.type">
        <xs:complexContent>
            <xs:extension base="RefEntry.type">
                <xs:sequence>
                    <xs:element name="rf3Offset" type="StringOffset.type"/>
                    <xs:element name="rf3Reserved" type="reserved32"/>
                </xs:sequence>
            </xs:extension>
        </xs:complexContent>
    </xs:complexType>
    <!-- Section 9.6.12 - Integer Reference (10) -->
    <xs:complexType name="IntegerRef.type">
        <xs:complexContent>
            <xs:extension base="RefEntry.type">
                <xs:sequence>
                    <xs:element name="rf7Value" type="int32"/>
                    <xs:element name="rf7Reserved" type="reserved16"/>
                </xs:sequence>
            </xs:extension>
        </xs:complexContent>
    </xs:complexType>
</xs:schema>
```

Fig. 5

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
  <xs:simpleType name="bit">
    <xs:restriction base="xs:byte">
      <xs:minInclusive value="0"/>
      <xs:maxInclusive value="1"/>
    </xs:restriction>
  </xs:simpleType>
<xs:simpleType name="bool1">
  <xs:restriction base="xs:boolean"/>
</xs:simpleType>
<xs:simpleType name="bool8">
    <xs:restriction base="xs:unsignedByte">
      <xs:enumeration value="255"/> <!-- True -->
      <xs:enumeration value="0"/>   <!-- False -->
    </xs:restriction>
</xs:simpleType>
<xs:simpleType name="nybble">
    <xs:restriction base="xs:unsignedByte">
      <xs:maxInclusive value="15"/>
    </xs:restriction>
</xs:simpleType>
<xs:simpleType name="uint7">
    <xs:restriction base="xs:unsignedByte">
      <xs:maxInclusive value="127"/>
    </xs:restriction>
</xs:simpleType>
<xs:simpleType name="int8">
  <xs:restriction base="xs:byte"/>
</xs:simpleType>
<xs:simpleType name="uint8">
  <xs:restriction base="xs:unsignedByte"/>
</xs:simpleType>
<xs:simpleType name="int16">
  <xs:restriction base="xs:short"/>
</xs:simpleType>
<xs:simpleType name="uint16">
  <xs:restriction base="xs:unsignedShort"/>
</xs:simpleType>
<xs:simpleType name="uint24">
    <xs:restriction base="xs:unsignedInt">
      <xs:maxInclusive value="16777216"/>
    </xs:restriction>
</xs:simpleType>
<xs:simpleType name="int32">
  <xs:restriction base="xs:int"/>
</xs:simpleType>
<xs:simpleType name="uint32">
  <xs:restriction base="xs:unsignedInt"/>
</xs:simpleType>
<xs:simpleType name="bitfield">
  <xs:restriction base="xs:hexBinary"/>
</xs:simpleType>
<xs:simpleType name="string">
  <xs:restriction base="xs:string"/>
</xs:simpleType>
<xs:simpleType name="reserved4">
    <xs:restriction base="xs:unsignedByte">
      <xs:maxInclusive value="15"/>
    </xs:restriction>
</xs:simpleType>
```

Fig. 6A

```xml
<xs:simpleType name="reserved8">
  <xs:restriction base="xs:unsignedByte"/>
</xs:simpleType>
<xs:simpleType name="reserved14">
  <xs:restriction base="xs:unsignedShort">
    <xs:maxInclusive value="16384"/>
  </xs:restriction>
</xs:simpleType>
<xs:simpleType name="reserved16">
  <xs:restriction base="xs:unsignedShort"/>
</xs:simpleType>
<xs:simpleType name="reserved32">
  <xs:restriction base="xs:unsignedInt"/>
</xs:simpleType>
<xs:complexType name="reserved8Array">
  <xs:sequence>
    <xs:element name="value" type="int8" minOccurs="0" maxOccurs="unbounded"/>
  </xs:sequence>
</xs:complexType>
<!-- base types used below -->
<xs:simpleType name="TableIndex.base"> <!-- Index to a table -->
  <xs:restriction base="xs:unsignedShort"/>
</xs:simpleType>
<xs:simpleType name="OptTableIndex.base">
  <xs:restriction base="xs:short">
    <xs:minInclusive value="-1"/>
    <xs:maxInclusive value="32767"/>
  </xs:restriction>
</xs:simpleType>
<!-- Index to a reference table (different from TableIndex b/c last element is reserved) -->
<xs:simpleType name="RefIndexBase.type">
  <xs:restriction base="TableIndex.base">
    <xs:maxInclusive value="65534"/>
  </xs:restriction>
</xs:simpleType>
<xs:simpleType name="OptRefIndexBase.type">
  <xs:restriction base="xs:short">
    <xs:minInclusive value="-1"/>
    <xs:maxInclusive value="32767"/>
  </xs:restriction>
</xs:simpleType>
<!-- Offsets into the heap -->
<xs:complexType name="HeapOffset.type">
  <xs:simpleContent>
    <xs:extension base="xs:unsignedShort">
      <xs:attribute name="ref" type="xs:IDREF" use="required"/>
    </xs:extension>
  </xs:simpleContent>
</xs:complexType>
<xs:complexType name="OptHeapOffset.type">
  <xs:simpleContent>
    <xs:extension base="xs:short">
      <xs:attribute name="ref" type="xs:IDREF" use="optional"/>
    </xs:extension>
  </xs:simpleContent>
</xs:complexType>
```

Fig. 6B

```xml
<!-- Reference table index -->
<xs:complexType name="RefIndex.type">
    <xs:simpleContent>
        <xs:extension base="RefIndexBase.type">
            <xs:attribute name="ref" type="xs:IDREF" use="required"/>
        </xs:extension>
    </xs:simpleContent>
</xs:complexType>
<xs:complexType name="OptRefIndex.type"> <!-- NOTE: Check out how these work. If not there, is it always -1? See bwText field. -->
    <xs:simpleContent>
        <xs:extension base="OptRefIndexBase.type">
            <xs:attribute name="ref" type="xs:IDREF" use="optional"/>
        </xs:extension>
    </xs:simpleContent>
</xs:complexType>
<!-- Widget table index -->
<xs:complexType name="WidgetTableIndex.type">
    <xs:simpleContent>
        <xs:extension base="TableIndex.base">
            <xs:attribute name="ref" type="xs:IDREF" use="required"/>
        </xs:extension>
    </xs:simpleContent>
</xs:complexType>
<xs:complexType name="OptWidgetTableIndex.type"> <!-- NOTE: If not there, is it always -1? See cwTableIndex, but spec doesn't say -->
    <xs:simpleContent>
        <xs:extension base="OptTableIndex.base">
            <xs:attribute name="ref" type="xs:IDREF" use="optional"/>
        </xs:extension>
    </xs:simpleContent>
</xs:complexType>
<!-- Action table (handler) index -->
<xs:complexType name="ActionIndex.type">
    <xs:simpleContent>
        <xs:extension base="TableIndex.base">
            <xs:attribute name="ref" type="xs:IDREF" use="required"/>
        </xs:extension>
    </xs:simpleContent>
</xs:complexType>
<!-- Action reference -->
<xs:complexType name="ActionOffset.type">
    <xs:simpleContent>
        <xs:restriction base="HeapOffset.type"/>
    </xs:simpleContent>
</xs:complexType>
<!-- String reference -->
<xs:complexType name="StringOffset.type">
    <xs:simpleContent>
        <xs:restriction base="HeapOffset.type"/>
    </xs:simpleContent>
</xs:complexType>
<!-- Widget reference -->
<xs:complexType name="WidgetOffset.type">
    <xs:simpleContent>
        <xs:restriction base="HeapOffset.type"/>
    </xs:simpleContent>
</xs:complexType>
```

Fig. 6C

```xml
<!-- Alignment style struct reference -->
<xs:complexType name="AlignmentStyleOffset.type">
    <xs:simpleContent>
        <xs:restriction base="HeapOffset.type"/>
    </xs:simpleContent>
</xs:complexType>
<!-- Border style struct reference -->
<xs:complexType name="BorderStyleOffset.type">
    <xs:simpleContent>
        <xs:restriction base="HeapOffset.type"/>
    </xs:simpleContent>
</xs:complexType>
<!-- Color style struct reference -->
<xs:complexType name="ColorStyleOffset.type">
    <xs:simpleContent>
        <xs:restriction base="HeapOffset.type"/>
    </xs:simpleContent>
</xs:complexType>
<!-- Font style struct reference -->
<xs:complexType name="FontStyleOffset.type">
    <xs:simpleContent>
        <xs:restriction base="HeapOffset.type"/>
    </xs:simpleContent>
</xs:complexType>
<!-- NavMap struct reference -->
<xs:complexType name="NavMapOffset.type">
    <xs:simpleContent>
        <xs:restriction base="HeapOffset.type"/>
    </xs:simpleContent>
</xs:complexType>
<xs:complexType name="OptNavMapOffset.type">
    <xs:simpleContent>
        <xs:restriction base="OptHeapOffset.type"/>
    </xs:simpleContent>
</xs:complexType>
<!-- Style struct reference -->
<xs:complexType name="StyleOffset.type">
    <xs:simpleContent>
        <xs:restriction base="HeapOffset.type"/>
    </xs:simpleContent>
</xs:complexType>
<!-- Widget extensions struct reference -->
<xs:complexType name="WidgetExtensionsStructOffset.type">
    <xs:simpleContent>
        <xs:restriction base="HeapOffset.type"/>
    </xs:simpleContent>
</xs:complexType>
<!-- Events reference -->
<xs:complexType name="EventsOffset.type">
    <xs:simpleContent>
        <xs:restriction base="HeapOffset.type"/>
    </xs:simpleContent>
</xs:complexType>
<xs:complexType name="OptEventsOffset.type">
    <xs:simpleContent>
        <xs:restriction base="OptHeapOffset.type"/>
    </xs:simpleContent>
</xs:complexType>
```

Fig. 6D

```
<!-- Miscellaneous -->
<xs:simpleType name="TableDirectoryIndexOrRefTableIndex.type"> <!-- If positive, a table directory index. Else reftable
index. -->
    <xs:restriction base="xs:short"/>
</xs:simpleType>
<xs:simpleType name="RowIndexOrRefTableIndex.type"> <!-- If positive, a row of a previously referenced table. Else
reftable index. -->
    <xs:restriction base="xs:short"/>
</xs:simpleType>
</xs:schema>
```

Fig. 6E

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
  <!-- Inclusions -->
  <xs:include schemaLocation="primitives.xsd"/>
  <xs:include schemaLocation="tables.xsd"/>
  <xs:include schemaLocation="actions.xsd"/>
  <xs:include schemaLocation="widgets.xsd"/>
  <xs:include schemaLocation="refs.xsd"/>
  <xs:include schemaLocation="structs.xsd"/>
  <!-- Section 8 -->
  <xs:element name="Resource" type="Resource.type"/>
  <xs:complexType name="Resource.type">
    <xs:sequence>
      <xs:element name="ResourceHeader" type="ResourceHeader.type"/>
      <xs:element name="Section" type="Section.type" minOccurs="1" maxOccurs="unbounded"/>
    </xs:sequence>
  </xs:complexType>
  <xs:complexType name="Section.type">
    <xs:sequence>
      <xs:element name="SectionHeader" type="SectionHeader.type"/>
      <xs:element name="TableDirectory" type="TableDirectory.type"/>
      <xs:element name="Tables" type="Tables.type" minOccurs="0" maxOccurs="1"/>
      <xs:element name="Heap" type="Heap.type" minOccurs="0" maxOccurs="1"/>
    </xs:sequence>
    <xs:attribute name="type" use="required">
      <xs:simpleType>
        <xs:restriction base="xs:token">
          <xs:enumeration value="common"/>
          <xs:enumeration value="platform"/>
        </xs:restriction>
      </xs:simpleType>
    </xs:attribute>
  </xs:complexType>
  <xs:complexType name="Heap.type">
    <xs:sequence minOccurs="0" maxOccurs="unbounded">
      <xs:choice>
        <xs:group ref="Action.class"/>
        <xs:group ref="Widget.class"/>
        <xs:group ref="Struct.class"/>
      </xs:choice>
    </xs:sequence>
  </xs:complexType>
  <!-- Section 8.1 -->
  <xs:complexType name="ResourceHeader.type">
    <xs:sequence>
      <xs:element name="rhMagic" type="bitfield"/>
      <xs:element name="rhMajor" type="uint8"/>
      <xs:element name="rhMinor" type="uint8"/>
      <xs:element name="rhType" type="uint8"/>
      <xs:element name="rhHeaderExtensionLength" type="uint8"/>
      <xs:element name="rhPrivateUseScope" type="uint24"/>
      <xs:element name="rhPrivateUseScopeParam" type="uint8"/>
      <xs:element name="rhPrivateUseCritical" type="bool1"/>
      <xs:element name="rhReservedExtensionCritical" type="bool1"/>
      <xs:element name="rhReserved" type="reserved14"/>
      <xs:element name="rhHeaderExtension" type="reserved8Array"/>
    </xs:sequence>
  </xs:complexType>
```

Fig. 7A

```xml
<!-- Section 8.2 -->
<xs:complexType name="SectionHeader.type">
    <xs:sequence>
        <xs:element name="shLength" type="uint24"/>
        <xs:element name="shHeapOffset" type="uint24"/>
        <xs:element name="shHeapLength" type="uint24"/>
        <xs:element name="shHeaderExtensionLength" type="uint8"/>
        <xs:element name="shHeaderExtension" type="reserved8Array"/>
    </xs:sequence>
</xs:complexType>
<!-- Section 8.3 -->
<xs:complexType name="TableDirectory.type">
    <xs:sequence>
        <xs:element name="tdCount" type="uint16"/>
        <xs:element name="Entry" type="TableDirectoryEntry.type" minOccurs="0" maxOccurs="unbounded"/>
    </xs:sequence>
</xs:complexType>
<xs:complexType name="TableDirectoryEntry.type">
    <xs:sequence>
        <xs:element name="tdExternal" type="bool1"/>
        <xs:element name="tdType" type="uint7"/>
        <xs:choice>
            <xs:element name="tdOffset" type="uint24"/>
            <xs:element name="tdResource" type="uint24"/>
        </xs:choice>
    </xs:sequence>
    <xs:attribute name="ref" type="xs:IDREF" use="required"/>
</xs:complexType>
</xs:schema>
```

Fig. 7B

```xml
<?xml version="1.0" encoding="UTF-8"?>
<Project>
    <Folder FolderName="XML Files" ExtStr="xml;cml;math;mtx;rdf;smil;svg;wml"/>
    <Folder FolderName="XSL Files" ExtStr="xsl;xslt"/>
    <Folder FolderName="XQuery Files" ExtStr="xq;xql;xquery"/>
    <Folder FolderName="HTML Files" ExtStr="html;htm;xhtml;asp"/>
    <Folder FolderName="DTD/Schemas" ExtStr="dtd;dcd;xdr;biz;xsd">
        <File FilePath=".\actions.xsd" HomeFolder="Yes"/>
        <File FilePath=".\ebifx.xsd" HomeFolder="Yes"/>
        <File FilePath=".\primitives.xsd" HomeFolder="Yes"/>
        <File FilePath=".\refs.xsd" HomeFolder="Yes"/>
        <File FilePath=".\structs.xsd" HomeFolder="Yes"/>
        <File FilePath=".\tables.xsd" HomeFolder="Yes"/>
        <File FilePath=".\widgets.xsd" HomeFolder="Yes"/>
    </Folder>
    <Folder FolderName="Entities" ExtStr="ent"/>
</Project>
```

Fig. 7C

```xml
<xs:schema xml:lang="en" targetNamespace="http://www.xfsi.com/2005/ebifx-i01"
 xmlns:xs="http://www.w3.org/2001/XMLSchema" xmlns="http://www.xfsi.com/2005/ebifx-i01">
  <!-- Inclusions -->
  <xs:include schemaLocation="primitives.xsd"/>
  <!-- Section A -->
  <xs:complexType name="Action.base">
    <xs:sequence>
      <xs:element name="opCode" type="int8"/>
    </xs:sequence>
    <xs:attribute name="id" type="xs:ID" use="required"/>
  </xs:complexType>
  <xs:group name="Action.class">
        <xs:choice>
                <xs:element name="Add" type="Add.type"/>
                <xs:element name="AddImmediate" type="AddImmediate.type"/>
                <xs:element name="AddWidget" type="AddWidget.type"/>
                <xs:element name="BitwiseAnd" type="BitwiseAnd.type"/>
                <xs:element name="BitwiseAndImmediate" type="BitwiseAndImmediate.type"/>
                <xs:element name="BitwiseComplement" type="BitwiseComplement.type"/>
                <xs:element name="BitwiseOr" type="BitwiseOr.type"/>
                <xs:element name="BitwiseOrImmediate" type="BitwiseOrImmediate.type"/>
                <xs:element name="Call" type="Call.type"/>
                <xs:element name="ConjunctiveIf" type="ConjunctiveIf.type"/>
                <xs:element name="DisjunctiveIf" type="DisjunctiveIf.type"/>
                <xs:element name="Divide" type="Divide.type"/>
                <xs:element name="DivideImmediate" type="DivideImmediate.type"/>
                <xs:element name="Filter" type="Filter.type"/>
                <xs:element name="GetFocus" type="GetFocus.type"/>
                <xs:element name="GetTableRows" type="GetTableRows.type"/>
                <xs:element name="HideWidget" type="HideWidget.type"/>
                <xs:element name="If" type="If.type"/>
                <xs:element name="LoadApplication" type="LoadApplication.type"/>
                <xs:element name="LoadPage" type="LoadPage.type"/>
                <xs:element name="LogicalAnd" type="LogicalAnd.type"/>
                <xs:element name="LogicalComplement" type="LogicalComplement.type"/>
                <xs:element name="LogicalOr" type="LogicalOr.type"/>
                <xs:element name="Modulo" type="Modulo.type"/>
                <xs:element name="ModuloImmediate" type="ModuloImmediate.type"/>
                <xs:element name="Multiply" type="Multiply.type"/>
                <xs:element name="MultiplyImmediate" type="MultiplyImmediate.type"/>
                <xs:element name="Negate" type="Negate.type"/>
                <xs:element name="Noop" type="Noop.type"/>
                <xs:element name="PopDecodedTrigger" type="PopDecodedTrigger.type"/>
                <xs:element name="Random" type="Random.type"/>
                <xs:element name="RedrawWidget" type="RedrawWidget.type"/>
                <xs:element name="RemoveFilteredDataTable" type="RemoveFilteredDataTable.type"/>
                <xs:element name="RemovePersistentStateItem" type="RemovePersistentStateItem.type"/>
                <xs:element name="RemoveWidget" type="RemoveWidget.type"/>
                <xs:element name="ResetWidget" type="ResetWidget.type"/>
                <xs:element name="Resume" type="Resume.type"/>
                <xs:element name="SelectService" type="SelectService.type"/>
                <xs:element name="SelectServiceComponent" type="SelectServiceComponent.type"/>
                <xs:element name="Set" type="Set.type"/>
                <xs:element name="SetFocus" type="SetFocus.type"/>
                <xs:element name="SetImmediate" type="SetImmediate.type"/>
```

Fig. 8A

```xml
            <xs:element name="SetWidgetProperty" type="SetWidgetProperty.type"/>
            <xs:element name="SetWidgetPropertyImmediate" type="SetWidgetPropertyImmediate.type"/>
            <xs:element name="ShowWidget" type="ShowWidget.type"/>
            <xs:element name="StartTimer" type="StartTimer.type"/>
            <xs:element name="StopTimer" type="StopTimer.type"/>
            <xs:element name="StringAppend" type="StringAppend.type"/>
            <xs:element name="StringClear" type="StringClear.type"/>
            <xs:element name="StringExtract" type="StringExtract.type"/>
            <xs:element name="StringLength" type="StringLength.type"/>
            <xs:element name="StringSearch" type="StringSearch.type"/>
            <xs:element name="SubmitForm" type="SubmitForm.type"/>
            <xs:element name="Subtract" type="Subtract.type"/>
            <xs:element name="SubtractImmediate" type="SubtractImmediate.type"/>
            <xs:element name="Suspend" type="Suspend.type"/>
            <xs:element name="Terminate" type="Terminate.type"/>
            <xs:element name="Test" type="Test.type"/>
            <xs:element name="TestImmediate" type="TestImmediate.type"/>
      </xs:choice>
</xs:group>
<!-- Section A.1 - ADD (0x10) -->
<xs:complexType name="Add.type">
   <xs:complexContent>
         <xs:extension base="Action.base"/>
   </xs:complexContent>
</xs:complexType>
<!-- Section A.2 - ADD IMMEDIATE (0x11) -->
<xs:complexType name="AddImmediate.type">
   <xs:complexContent>
         <xs:extension base="Action.base"/>
   </xs:complexContent>
</xs:complexType>
<!-- Section A.3 - ADD WIDGET (0x86) -->
<xs:complexType name="AddWidget.type">
   <xs:complexContent>
         <xs:extension base="Action.base"/>
   </xs:complexContent>
</xs:complexType>
<!-- Section A.4 - BITWISE AND (0x20) -->
<xs:complexType name="BitwiseAnd.type">
   <xs:complexContent>
         <xs:extension base="Action.base"/>
   </xs:complexContent>
</xs:complexType>
<!-- Section A.5 - BITWISE AND IMMEDIATE (0x21) -->
<xs:complexType name="BitwiseAndImmediate.type">
   <xs:complexContent>
         <xs:extension base="Action.base"/>
   </xs:complexContent>
</xs:complexType>
<!-- Section A.6 - BITWISE COMPLEMENT (0x24) -->
      <xs:complexType name="BitwiseComplement.type">
         <xs:complexContent>
               <xs:extension base="Action.base"/>
         </xs:complexContent>
</xs:complexType>
```

Fig. 8B

```xml
<!-- Section A.7 - BITWISE OR (0x22) -->
<xs:complexType name="BitwiseOr.type">
   <xs:complexContent>
         <xs:extension base="Action.base"/>
   </xs:complexContent>
</xs:complexType>
<!-- Section A.8 - BITWISE OR IMMEDIATE (0x23) -->
         <xs:complexType name="BitwiseOrImmediate.type">
            <xs:complexContent>
                  <xs:extension base="Action.base"/>
            </xs:complexContent>
</xs:complexType>
<!-- Section A.9 - CALL (0x01) -->
<xs:complexType name="Call.type">
   <xs:complexContent>
         <xs:extension base="Action.base"/>
   </xs:complexContent>
</xs:complexType>
<!-- Section A.10 - CONJUNCTIVE IF (0x03) -->
<xs:complexType name="ConjunctiveIf.type">
   <xs:complexContent>
         <xs:extension base="Action.base"/>
   </xs:complexContent>
</xs:complexType>
<!-- Section A.11 - DISJUNCTIVE IF (0x04) -->
<xs:complexType name="DisjunctiveIf.type">
   <xs:complexContent>
         <xs:extension base="Action.base"/>
   </xs:complexContent>
</xs:complexType>
<!-- Section A.12 - DIVIDE (0x16) -->
<xs:complexType name="Divide.type">
   <xs:complexContent>
         <xs:extension base="Action.base"/>
   </xs:complexContent>
</xs:complexType>
<!-- Section A.13 - DIVIDE IMMEDIATE (0x17) -->
<xs:complexType name="DivideImmediate.type">
   <xs:complexContent>
         <xs:extension base="Action.base"/>
   </xs:complexContent>
</xs:complexType>
<!-- Section A.14 - FILTER (0x91) -->
<xs:complexType name="Filter.type">
   <xs:complexContent>
         <xs:extension base="Action.base"/>
   </xs:complexContent>
</xs:complexType>
<!-- Section A.15 - GET FOCUS (0x85) -->
<xs:complexType name="GetFocus.type">
   <xs:complexContent>
         <xs:extension base="Action.base"/>
   </xs:complexContent>
</xs:complexType>
```

Fig. 8C

```xml
<!-- Section A.16 - GET TABLE ROWS (0x90) -->
<xs:complexType name="GetTableRows.type">
    <xs:complexContent>
            <xs:extension base="Action.base"/>
    </xs:complexContent>
</xs:complexType>
<!-- Section A.17 - HIDE WIDGET (0x82) -->
<xs:complexType name="HideWidget.type">
    <xs:complexContent>
            <xs:extension base="Action.base"/>
    </xs:complexContent>
</xs:complexType>
<!-- Section A.18 - IF (0x02) -->
<xs:complexType name="If.type">
    <xs:complexContent>
            <xs:extension base="Action.base"/>
    </xs:complexContent>
</xs:complexType>
<!-- Section A.19 - LOAD APPLICATION (0x75) -->
<xs:complexType name="LoadApplication.type">
    <xs:complexContent>
            <xs:extension base="Action.base"/>
    </xs:complexContent>
</xs:complexType>
<!-- Section A.20 - LOAD PAGE (0x76) -->
<xs:complexType name="LoadPage.type">
    <xs:complexContent>
            <xs:extension base="Action.base"/>
    </xs:complexContent>
</xs:complexType>
<!-- Section A.21 - LOGICAL AND (0x26) -->
<xs:complexType name="LogicalAnd.type">
    <xs:complexContent>
            <xs:extension base="Action.base"/>
    </xs:complexContent>
</xs:complexType>
<!-- Section A.22 - LOGICAL OR (0x28) -->
<xs:complexType name="LogicalOr.type">
    <xs:complexContent>
            <xs:extension base="Action.base"/>
    </xs:complexContent>
</xs:complexType>
<!-- Section A.23 - LOGICAL COMPLEMENT (0x2A) -->
<xs:complexType name="LogicalComplement.type">
    <xs:complexContent>
            <xs:extension base="Action.base"/>
    </xs:complexContent>
</xs:complexType>
<!-- Section A.24 - MODULO (0x18) -->
<xs:complexType name="Modulo.type">
    <xs:complexContent>
            <xs:extension base="Action.base"/>
    </xs:complexContent>
</xs:complexType>
```

Fig. 8D

```xml
<!-- Section A.25 - MODULO IMMEDIATE (0x19) -->
<xs:complexType name="ModuloImmediate.type">
   <xs:complexContent>
      <xs:extension base="Action.base"/>
   </xs:complexContent>
</xs:complexType>
<!-- Section A.26 - MULTIPLY (0x14) -->
<xs:complexType name="Multiply.type">
   <xs:complexContent>
      <xs:extension base="Action.base"/>
   </xs:complexContent>
</xs:complexType>
<!-- Section A.27 - MULTIPLE IMMEDIATE (0x15) -->
<xs:complexType name="MultiplyImmediate.type">
   <xs:complexContent>
      <xs:extension base="Action.base"/>
   </xs:complexContent>
</xs:complexType>
<!-- Section A.28 - NEGATE (0x1A) -->
<xs:complexType name="Negate.type">
   <xs:complexContent>
      <xs:extension base="Action.base"/>
   </xs:complexContent>
</xs:complexType>
<!-- Section A.29 - NOOP (0x00) -->
<xs:complexType name="Noop.type">
   <xs:complexContent>
     <xs:extension base="Action.base"/>
   </xs:complexContent>
</xs:complexType>
<!-- Section A.30 - POP DECODED TRIGGER (0x93) -->
<xs:complexType name="PopDecodedTrigger.type">
   <xs:complexContent>
      <xs:extension base="Action.base"/>
   </xs:complexContent>
</xs:complexType>
<!-- Section A.31 - RANDOM (0x30) -->
<xs:complexType name="Random.type">
   <xs:complexContent>
      <xs:extension base="Action.base"/>
   </xs:complexContent>
</xs:complexType>
<!-- Section A.32 - REDRAW WIDGET (0x81) -->
<xs:complexType name="RedrawWidget.type">
   <xs:complexContent>
      <xs:extension base="Action.base">
        <xs:sequence>
           <xs:element name="widgetIndex" type="RefIndex.type"/>
        </xs:sequence>
      </xs:extension>
   </xs:complexContent>
</xs:complexType>
<!-- Section A.33 - REMOVE FILTERED DATA TABLE (0x92) -->
<xs:complexType name="RemoveFilteredDataTable.type">
   <xs:complexContent>
      <xs:extension base="Action.base"/>
   </xs:complexContent>
</xs:complexType>
```

Fig. 8E

```xml
<!-- Section A.34 - REMOVE PERSISTENT STATE ITEM (0x0A) -->
<xs:complexType name="RemovePersistentStateItem.type">
    <xs:complexContent>
            <xs:extension base="Action.base"/>
    </xs:complexContent>
</xs:complexType>
<!-- Section A.35 - REMOVE WIDGET (0x87) - -->
<xs:complexType name="RemoveWidget.type">
    <xs:complexContent>
            <xs:extension base="Action.base"/>
    </xs:complexContent>
</xs:complexType>
<!-- Section A.36 - RESET WIDGET (0x80) -->
<xs:complexType name="ResetWidget.type">
    <xs:complexContent>
            <xs:extension base="Action.base"/>
    </xs:complexContent>
</xs:complexType>
<!-- Section A.37 - RESUME (0x72) -->
<xs:complexType name="Resume.type">
    <xs:complexContent>
            <xs:extension base="Action.base"/>
    </xs:complexContent>
</xs:complexType>
<!-- Section A.38 - SELECT SERVICE (0x73) -->
<xs:complexType name="SelectService.type">
    <xs:complexContent>
            <xs:extension base="Action.base"/>
    </xs:complexContent>
</xs:complexType>
<!-- Section A.39 - SELECT SERVICE COMPONENT (0x73) -->
<xs:complexType name="SelectServiceComponent.type">
    <xs:complexContent>
            <xs:extension base="Action.base"/>
    </xs:complexContent>
</xs:complexType>
<!-- Section A.40 - SET (0x08) -->
<xs:complexType name="Set.type">
    <xs:complexContent>
            <xs:extension base="Action.base"/>
    </xs:complexContent>
</xs:complexType>
<!-- Section A.41 - SET FOCUS (0x84) -->
<xs:complexType name="SetFocus.type">
    <xs:complexContent>
            <xs:extension base="Action.base"/>
    </xs:complexContent>
</xs:complexType>
<!-- Section A.42 - SET IMMEDIATE (0x09) -->
<xs:complexType name="SetImmediate.type">
    <xs:complexContent>
        <xs:extension base="Action.base">
            <xs:sequence>
                <xs:element name="refIndex" type="RefIndex.type"/>
                <xs:element name="value" type="int32"/>
            </xs:sequence>
        </xs:extension>
    </xs:complexContent>
</xs:complexType>
```

Fig. 8F

```xml
<!-- Section A.43 - SET WIDGET PROPERTY (0x88) -->
<xs:complexType name="SetWidgetProperty.type">
    <xs:complexContent>
            <xs:extension base="Action.base"/>
    </xs:complexContent>
</xs:complexType>
<!-- Section A.44 - SET WIDGET PROPERTY IMMEDIATE (0x89) -->
<xs:complexType name="SetWidgetPropertyImmediate.type">
    <xs:complexContent>
            <xs:extension base="Action.base"/>
    </xs:complexContent>
</xs:complexType>
<!-- Section A.45 - SHOW WIDGET (0x83) -->
<xs:complexType name="ShowWidget.type">
    <xs:complexContent>
            <xs:extension base="Action.base"/>
    </xs:complexContent>
</xs:complexType>
<!-- Section A.46 - START TIMER (0x78) -->
<xs:complexType name="StartTimer.type">
    <xs:complexContent>
        <xs:extension base="Action.base">
            <xs:sequence>
                <xs:element name="timerIndex" type="RefIndex.type"/>
            </xs:sequence>
        </xs:extension>
    </xs:complexContent>
</xs:complexType>
<!-- Section A.47 - STOP TIMER (0x79) -->
<xs:complexType name="StopTimer.type">
    <xs:complexContent>
            <xs:extension base="Action.base"/>
    </xs:complexContent>
</xs:complexType>
<!-- Section A.48 - STRING APPEND (0x62) -->
<xs:complexType name="StringAppend.type">
    <xs:complexContent>
            <xs:extension base="Action.base"/>
    </xs:complexContent>
</xs:complexType>
<!-- Section A.49 - STRING CLEAR (0x61) -->
<xs:complexType name="StringClear.type">
    <xs:complexContent>
            <xs:extension base="Action.base"/>
    </xs:complexContent>
</xs:complexType>
<!-- Section A.50 - STRING EXTRACT (0x63) -->
<xs:complexType name="StringExtract.type">
    <xs:complexContent>
            <xs:extension base="Action.base"/>
    </xs:complexContent>
</xs:complexType>
<!-- Section A.51 - STRING LENGTH (0x60) -->
<xs:complexType name="StringLength.type">
    <xs:complexContent>
            <xs:extension base="Action.base"/>
    </xs:complexContent>
</xs:complexType>
```

Fig. 8G

```
<!-- Section A.52 - STRING SEARCH (0x64) -->
<xs:complexType name="StringSearch.type">
   <xs:complexContent>
         <xs:extension base="Action.base"/>
   </xs:complexContent>
</xs:complexType>
<!-- Section A.53 - SUBMIT FORM (0x77) -->
<xs:complexType name="SubmitForm.type">
   <xs:complexContent>
         <xs:extension base="Action.base"/>
   </xs:complexContent>
</xs:complexType>
<!-- Section A.54 - SUBTRACT (0x12) -->
<xs:complexType name="Subtract.type">
   <xs:complexContent>
         <xs:extension base="Action.base"/>
   </xs:complexContent>
</xs:complexType>
<!-- Section A.55 - SUBTRACT IMMEDIATE (0x13) -->
<xs:complexType name="SubtractImmediate.type">
   <xs:complexContent>
         <xs:extension base="Action.base"/>
   </xs:complexContent>
</xs:complexType>
<!-- Section A.56 - SUSPEND (0x71) -->
<xs:complexType name="Suspend.type">
   <xs:complexContent>
         <xs:extension base="Action.base"/>
   </xs:complexContent>
</xs:complexType>
<!-- Section A.57 - TERMINATE (0x70) -->
<xs:complexType name="Terminate.type">
   <xs:complexContent>
         <xs:extension base="Action.base"/>
   </xs:complexContent>
</xs:complexType>
<!-- Section A.58 - TEST (0x06) -->
<xs:complexType name="Test.type">
   <xs:complexContent>
         <xs:extension base="Action.base"/>
   </xs:complexContent>
</xs:complexType>
<!-- Section A.59 - TEST IMMEDIATE (0x07) -->
<xs:complexType name="TestImmediate.type">
   <xs:complexContent>
         <xs:extension base="Action.base"/>
   </xs:complexContent>
</xs:complexType>
</xs:schema>
```

Fig. 8H

VERIFICATION OF SEMANTIC CONSTRAINTS IN MULTIMEDIA DATA AND IN ITS ANNOUNCEMENT, SIGNALING AND INTERCHANGE

RELATED APPLICATIONS

The present application claims the priority benefit and is a NONPROVISIONAL of U.S. Provisional Patent Application 60/677,759, filed May 3, 2005, incorporated herein by reference, and is also a CONTINUATION-IN-PART of, claims the priority benefit of and incorporates by reference U.S. patent application Ser. No. 11/253,892, entitled "OPTIMIZED APPLICATION ON-THE-WIRE FORMAT FOR CONSTRUCTION, DELIVERY AND DISPLAY OF iTV CONTENT", filed 18 Oct., 2005. In addition, the following patent applications, each of which is assigned to the assignee of the present invention, is incorporated herein by reference:

1. U.S. patent application Ser. No. 10/390,064, entitled "SYSTEM AND METHOD FOR CONSTRUCTION, DELIVERY AND DISPLAY OF iTV CONTENT", filed 14 Mar., 2003;
2. U.S. patent application Ser. No. 10/630,815, entitled "SYSTEM AND METHOD FOR CONSTRUCTION, DELIVERY AND DISPLAY OF iTV CONTENT", filed 29 Jul., 2003; and
3. U.S. patent application Ser. No. 10/933,845, entitled "SYSTEM AND METHOD FOR PREFERRED PLACEMENT PROGRAMMING OF iTV CONTENT", filed 2 Sep., 2004.

FIELD OF THE INVENTION

The present invention relates to systems and methods for delivery of enhanced television content to subscribers, and in particular relates to the conversion of binary encoded multimedia data components into extensible markup language (XML) files.

BACKGROUND

Interactive television (iTV) is currently available in varying forms and there is perhaps no single, universally accepted definition for this term. Most, however, would agree that iTV systems combine, in some form or other, the passive viewing experience of traditional TV viewing with the interactive nature of external data and content sources such as the World Wide Web. Thus, in different implementations, iTV might allow viewers (perhaps more appropriately termed subscribers) to review local news headlines or weather forecasts while watching their favorite television shows, to chat with other viewers about the latest plot twists, and/or to search for an obtain enhanced content regarding a currently televised program. Many cable and satellite TV providers have deployed iTV systems that allow subscribers to order products seen in commercials or video on demand presentations with the click of a remote control button. And certainly all iTV systems have a version of an interactive program guide that allows subscribers to learn about and select desired programming.

A specific service offered within the iTV landscape is enhanced TV (ETV) broadcasting that provides interactive content linked to video programming. A user can request information on products within ads, access additional program information such as sports statistics, or otherwise interact with a television broadcast such as a game or reality based show. This functionality is achieved through the execution and transmission of an ETV application and corresponding data sent in the broadcast channel or other mechanism along with the video broadcast.

These and other iTV services are deployed as a set of applications over the service provider's network. Such applications are received at the subscriber's premises via a set-top box or similar device, where they are interpreted (compiled), executed and the corresponding data is displayed on a television.

Many applications may be presented to end users via a common user interface and order/transaction entry and tracking system. However, each application has specific integration, management and distribution issues that arise depending on the environment that the network operators choose to deploy and significant problems are experienced by application providers and distributors in deploying and managing their ETV applications as a result. Stated differently, application providers and distributors face problems in developing and managing their ETV applications because there exists a proliferation of technologies and standards for the delivery of ETV applications and different network operators have chosen to deploy different combinations of these technologies. For example, ETV application providers must cope with networks that have been cobbled together with different technologies such as:

1. Head-end technology from different providers.
2. Set-top boxes from different manufacturers.
3. Various combinations of network topologies.
4. Middleware from different providers.
5. VOD servers from a variety of providers and vendors.
6. Billing systems from multiple different companies.
7. Conditional access systems from different vendors.
8. Differing implementation standards such as HTML, XHTML, XML, Ecmascript, OCAP, MHP, ATVEF, DASE, etc.
9. Various programming languages, such as Java, C, C++, etc.

Content providers and application developers must navigate through this maze of often incompatible and unique combinations of equipment, technologies and standards, and often must develop a unique and different application for each such combination that they wish to target. For their part, network operators must deploy, configure, manage and operate ETV applications on each different network configuration individually, increasing cost, complexity, and staffing needs, while reducing the number of service that can be deployed, and the quality of those services.

Another significant problem for the deployment of ETV applications in the United States is that the majority of in-service set-top boxes have relatively limited capabilities with which to store and process ETV applications. For example, many distributed applications may not be executable on various set-top boxes due to the memory and processing requirements to compile or otherwise interpret the application and data for proper display. These set-top limitations make it very difficult to support the features, functions and viewer response times for ETV applications that are required for a compelling and rich user experience.

SUMMARY OF THE INVENTION

In one embodiment, the present invention provides for converting a binary encoded multimedia data into an XML file, and validating the XML file according to a predetermined XML or other schemas. Following validation, the binary information may be subject to further processing. The binary encoded multimedia data may exist in a streaming format, such as an MPEG-2 transport stream, or an AVC broadcast stream. Validating the XML file may involve validating broadcast video elementary stream formats, validating PMT information; or validating the XML file according to one or more MPEG protocols, MHP protocols, or CableLabs Open-Cable™ protocols (or other communication protocols) and/or one or more predefined standards such as those promulgated by or for DVB (including but not limited to DVB-T or DVB-H), ATSC, SCTE, ANSI, IETF, ISO, or SMPTE. Such validation may occur at a computer system remote from where the binary information is stored and/or converted to XML.

In a further embodiment, the present invention permits the conversion of a collection of well-formed, but possibly semantically invalid, binary encoded multimedia data components or packages as well as the binary encoded announcement, signaling, and interchange protocols used in their transmission into one or more well-formed XML files. Such XML files may then be validated according to one or more pre-defined XML schemas, or similar schema languages such as RELAX NG schemas, in order to verify that the data and protocol structures and substructures adhere to prior defined semantic constraints.

BRIEF DESCRIPTION OF THE DRAWINGS

The present invention is illustrated by way of example and not limitation in the figures of the accompanying drawings, in which:

FIGS. 2A-2C, collectively, present an example of an XML schema that defines and processes widgets according to an embodiment of the present invention.

FIGS. 3A-3D, collectively, present an example of an XML schema that defines and processes tables according to an embodiment of the present invention.

FIGS. 4A-4D, collectively, present an example of an XML schema that defines and processes structures according to an embodiment of the present invention.

FIG. 5 presents an example of an XML schema that defines and processes refs according to an embodiment of the present invention.

FIGS. 6A-6E, collectively, present an example of an XML schema that defines and processes primitives according to an embodiment of the present invention.

FIGS. 7A-7B, collectively, present an example of an XML schema that defines and processes EBIFX according to an embodiment of the present invention.

FIG. 7C presents an example of an XML schema that defines and processes another EBIFX according to a further embodiment of the present invention.

FIGS. 8A-8H, collectively, present an example of an XML schema that defines and processes Actions according to yet another embodiment of the present invention.

DETAILED DESCRIPTION

Figure 1:
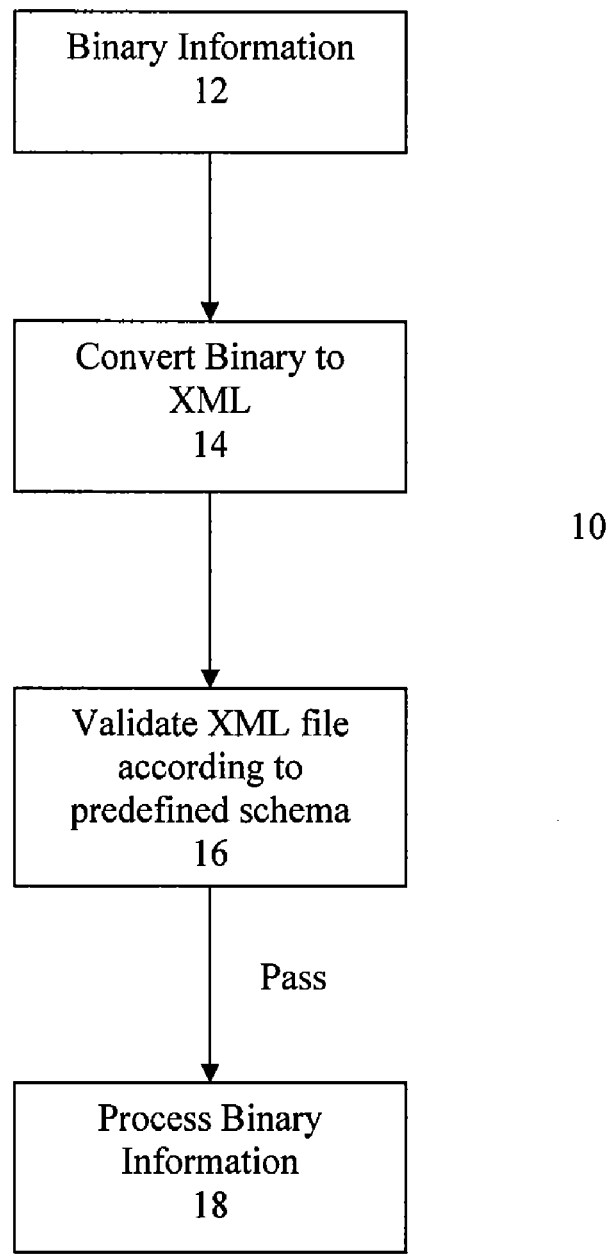
FIG. 1 illustrates a method of converting a binary file to an XML file for validation or other purposes according to an embodiment of the present invention.

The present invention permits the conversion of a collection of well-formed, but possibly semantically invalid, binary encoded multimedia data components or packages as well as the binary encoded announcement, signaling, and interchange protocols used in their transmission into one or more well-formed XML files. Such XML files may then be validated according to one or more pre-defined XML schemas, or similar schema languages such as RELAX NG schemas, in order to verify that the data and protocol structures and substructures adhere to each prior defined semantic constraint. For example, such validation could determine whether a field's value is an acceptable value according to its defined type, whether a co-occurrence constraint is satisfied, if field x is in range [x0, x1] then field y must be in range [y0, y1], etc.

The above-cited patent applications describe a system wherein iTV content is created and deployed using a particular authoring specification that provides for the presentation of content through one or more templates. This allows application definition and behavior to remain common across multiple client device types, middleware platforms, and/or iTV operating environments. Of course, many other forms of content creation and distribution exist and the present invention is not limited to the schemes discussed in the above-cited patent applications. Subsequent to distributing content (or as part of the distribution chain), and prior to execution or consumption of the content, it is useful to validate it to ensure compliance with various protocols, standards formats or other pre-defined semantic constraints.

Any standard or specification for formatting content can be expressed as an XML schema; hence, in accordance with the present invention the binary encoded multimedia data is converted to XML content governed by a pre-defined schema and then validated according to rules defining that schema. As illustrated in FIG. 1, the present invention provides a method 10 for the conversion of binary information (data) 12 into an XML format for purposes of validation before being subject to further processing. The binary encoded data may be multimedia (e.g., audio/video) data that exists in a streaming format, such as an MPEG-2 transport stream, or an AVC broadcast stream. Such data binary data may be generated or harvested from any of a number of data feeds from various content providers (e.g., via the Internet or audio/video distribution systems). In some cases, following validation the binary information may be delivered a set top box associated with a cable or satellite audio/video distribution network.

As indicated above, following the conversion 14 of the binary information the resulting XML file may be validated 16 according to one or more pre-defined XML schemas and/or XML processing tools (e.g., such as Xpath), or similar XML schema languages (e.g., such as RELAX NG). Such validation may occur at a computer system remote from where the binary information is located and/or converted to the XML file. In such cases, the XML file would be transmitted to the remote computer system for prior to the validation operations.

Validating the XML file may involve validating broadcast video elementary stream formats, validating PMT information; or validating the XML file according to one or more MPEG protocols, MHP protocols, or CableLabs Open-Cable™ protocols and/or one or more standards such as those promulgated by or for DVB (including but not limited to DVB-T or DVB-H), ATSC, SCTE, ANSI, IETF, ISO, or SMPTE. Assuming the validation indicates that the binary information is correct, the binary information may be subject to further processing 18 (e.g., processing by a set top box). The validation of the XML files may be performed in order to ensure that the binary data and protocol structures adhere to pre-defined semantic constraints.

The XML schemas presented herein are examples of an expression of the ETV binary exchange format (EBIF) described in the above-cited patent applications. The following capabilities provide examples of uses to which the converted XML content from the binary encoded content can be applied:

1. Allows for validation of binary encoded content subsequent to distribution (or in the distribution chain) and prior to execution.
2. Provides an interchange format between BIF generators, validation tools, editing tools, etc.
3. Aids with source level debugging for execution, display and debugging of BIF applications. For example, validating the XML file produces validated XML content and the validated XML content may be used as a debugging aid.

4. Provides an extensibility aid for migration to later versions of BIF by migrating BIF applications in XML representations. For example, validating the XML file produces validated XML content and the validated XML content may be converted to another version of the XML schema, and the converted XML content used to create binary multimedia data compliant with another protocol version of binary encoded content.

EBIF is one example of binary encoded content and the present invention is not limited thereto. The remainder of this description sets forth some specific examples of the present XML schemas for use in interchanging, decoding, and rendering ETV applications.

Widgets: FIGS. 2A-2C, collectively, present an example of an XML schema that defines and processes widgets according to an embodiment of the present invention. A widget is a user interface construct that is typically, but not necessarily associated with some direct presentation semantic; e.g., a button widget and an input text field widget have presentation semantics, whereas a hidden field widget and a timer widget do not. A widget may be specified by a set of static properties necessary to construct an instance of the widget in a user agent (or authoring station). A widget may also be associated with a set of dynamic properties that may change value as a consequence of user events, system events, or programmatic actions applied to the widget (e.g., mutating the value of a widget under control of a logic programming construct).

Tables: FIGS. 3A-3D, collectively, present an example of an XML schema that defines and processes tables according to an embodiment of the present invention.

Structure: FIGS. 4A-4D, collectively, present an example of an XML schema that defines and processes structures according to an embodiment of the present invention.

Refs: FIG. 5 presents an example of an XML schema that defines and processes refs according to an embodiment of the present invention.

Primitives: FIGS. 6A-6E, collectively, present an example of an XML schema that defines and processes primitives according to an embodiment of the present invention.

EBIFX: FIGS. 7A-7B, collectively, present an example of an XML schema that defines and processes EBIFX according to an embodiment of the present invention. FIG. 7C presents an example of an XML schema that defines and processes another EBIFX according to a further embodiment of the present invention.

Actions: FIGS. 8A-8H, collectively, present an example of an XML schema that defines and processes Actions according to yet another embodiment of the present invention.

Thus, systems and method that provide for conversion of binary encoded multimedia data components into extensible markup language (XML) files have been described. In one embodiment, the present invention provides for converting a binary encoded multimedia data into an extensible markup language (XML) file, and validating the XML file according to a predetermined XML or other schema. Assuming the validation passes, the binary information may then be subject to further processing. The binary encoded multimedia data may exist in a streaming format, such as an MPEG-2 transport stream, or an AVC broadcast stream. Validating the XML file may involve validating broadcast video elementary stream formats, validating PMT information; or validating the XML file according to one or more protocols and/or standards-defined formats.

Although the present invention has been discussed with respect to several illustrated embodiments, these examples should not be read as limited the scope of the invention, which is best understood by reference to the claims, which follow.

What is claimed is:

1. A method, comprising converting, by a computer, binary encoded multimedia data of a multimedia format into an extensible markup language (XML) file, performing a validation on the XML file, the validation being validating the XML file according to a predetermined XML schema and a semantic constraint of the multimedia format, wherein the validation produces validated XML content and the validated XML content is converted to an XML schema to produce converted XML content.

2. The method of claim 1, wherein at least one of the validations of the XML file occurs at a computer system remote from one at which the binary file is located.

3. The method of claim 1, wherein the binary encoded multimedia data exists in a streaming format.

4. The method of claim 3, wherein the streaming format comprises an MPEG-2 transport stream.

5. The method of claim 3, wherein the streaming format comprises an AVC broadcast stream.

6. The method of claim 1, wherein at least one of the validations of the XML file comprises validating broadcast video elementary stream formats.

7. The method of claim 1, wherein at least one of the validations of the XML file comprises validating PMT information.

8. The method of claim 1, wherein at least one of the validations of the XML file comprises validating the XML file according to one or more MPEG protocols.

9. The method of claim 1, wherein at least one of the validations of the XML file comprises validating the XML file according to one or more MHP products.

10. The method of claim 1, wherein at least one of the validations of the XML file comprises validating the XML file according to one or more DVB standards.

11. The method of claim 1, wherein at least one of the validations of the XML file comprises validating the XML file according to one or more CableLabs OpenCable protocols.

12. The method of claim 1, wherein at least one of the validations of the XML file comprises validating the XML file according to one or more ATSC standards.

13. The method of claim 1, wherein at least one of the validations of the XML file comprises validating the XML file according to one or more SCTE standards.

14. The method of claim 1, wherein at least one of the validations of the XML file comprises validating the XML file according to one or more ANSI standards.

15. The method of claim 1, wherein at least one of the validations of the XML file comprises validating the XML file according to one or more IETF standards.

16. The method of claim 1, wherein at least one of the validations of the XML file comprises validating the XML file according to one or more ISO standards.

17. The method of claim 1, wherein at least one of the validations of the XML file comprises validating the XML file according to one or more SMPTE standards.

18. The method of claim 1, wherein at least one of the validations of the XML file produces validated XML content and the validated XML content is used as a debugging aid.

19. The method of claim 1, wherein the converted XML content is used to create further binary multimedia data compliant with another protocol version of binary encoded content.

* * * * *